US006382582B1

(12) United States Patent
Brown

(10) Patent No.: US 6,382,582 B1
(45) Date of Patent: May 7, 2002

(54) SAFETY TREE STAND

(76) Inventor: Norma Brown, 2721 Kings Hwy., apt. 4M, Brooklyn, NY (US) 11229

( * ) Notice: Subject to any disclaimer, the term of this patent is extended or adjusted under 35 U.S.C. 154(b) by 0 days.

(21) Appl. No.: 09/799,457

(22) Filed: Mar. 5, 2001

(51) Int. Cl.[7] .............................................. F16M 13/00

(52) U.S. Cl. ......................... 248/521; 169/58; 248/523; 340/618

(58) Field of Search ................................ 248/521, 524, 248/527, 519, 523; 340/618, 620; 169/58

(56) References Cited

U.S. PATENT DOCUMENTS

| | | | | |
|---|---|---|---|---|
| 4,075,614 A | * | 2/1978 | White | 340/227.1 |
| 4,623,878 A | * | 11/1986 | Schoenwetter | 340/628 |
| 5,625,345 A | * | 4/1997 | Stark et al. | 340/628 |
| 5,821,865 A | * | 10/1998 | Solak | 340/628 |
| 6,021,852 A | * | 2/2000 | Barnett et al. | 169/58 |
| 6,087,946 A | * | 7/2000 | Menard, Jr. | 340/618 |

* cited by examiner

*Primary Examiner*—Ramon O. Ramirez
(74) *Attorney, Agent, or Firm*—Michael I Kroll

(57) ABSTRACT

The present invention 10 discloses a safety stand for a tree 18 having a main housing body 20 and attached thereto a secondary housing body 32. The main housing 20 is elliptically shaped having situated thereon illumination lights 26, LED lights 36 along with transparent picture sleeves 38. Also attached thereto is a mounting collar 28 with threaded screws 30 for receiving and holding a tree trunk along having an electrical outlet 34 disposed thereon. The main housing 20 also contains a CD player 24 along with a water reservoir 62 for watering the tree. Also contained on the main housing 20 is an extinguisher system having flame sensors 76 attached thereto in the form of decorative ornamental bulbs 12 placed throughout the tree. Vent holes 70 are provided in the bulbs 12 through which air can pass in the form of smoke so as to activate the sensors 76 and thereby having a bulb transmitter 78 send a signal to a means for an alarm 46 disposed in the main housing body. Extinguishing conduits 40 run around the outside of the main housing 20 having retardant outlets 42 disposed thereon through which retardant is released from a pressurized fire retardant compartment 60. The secondary housing body 32 contains a tree rotation system comprising a motor 50 and bevel gears 48, 52 along with a mounting collar 28. An alternative embodiment is disclosed wherein an artificial tree is held by a central rotating shaft 86 and a central conduit 88 for fire retardant is contained therein so that the sensor when activated will disperse retardant over and about the artificial tree. Another embodiment discloses a bulb 12 having fire retardant outlets 80 and a supply of retardant 84 disposed therein which bulb rotates and directly sprays retardant about.

22 Claims, 17 Drawing Sheets

SAFETY TREE STAND

BACKGROUND OF THE INVENTION

1. Field of the Invention

The present invention relates generally to a Christmas tree stand and, more specifically, to a Christmas tree stand that rotates, plays music and extinguishes fires. The present device consists mainly of three systems and a housing body. The housing body consists of two main components a main housing body and a secondary housing body. Situated within the main housing body are the primary components of the extinguishing system, power source, CD player and a water reservoir. The receiver serves the function of surrounding the base of the tree and providing water for the trees later use. The main housing body is an elliptical shape to fit all the necessary components efficiently. Along the outside perimeter of the device four illumination lights are provided for the purpose of producing underlighting on the tree to produce a more aesthetic look. On the out side perimeter of the device are LED lights to enhance the appearance of the device in addition transparent picture sleeves have been applied to the front, back and sides so that a holiday picture may be inserted. The secondary housing body contains all the primary components of the rotation system, a mounting collar, and the speakers associated with the audio system and alarm. The rotation system consists significantly of two bevel gears situated into one another at a 90-degree angle. One bevel gear is turned in either a clockwise or counter clockwise rotation by an electric motor, this in turn causes the second bevel gear and mounting collar to turn. The mounting collar serves as a means to grab the tree via threaded mounting screws which secure the tree to the collar by exerting pressure and boring into the tree. Also the mounting collar serves as a means to provide power by an electric outlet fitted on the upper portion powered by copper rings making contact with two contact bushes connected to a power source. The extinguishing system works by the means of many small, Smoke CO2 and flame sensors in the form of decorative ornament bulbs placed throughout the tree. Vent holes in the bottom of the bulb are placed to allow air to be exposed to the sensor housed inside so that it may function properly. Should a sensor detect a fire an infra red signal would be sent via the bulbs transmitter to the base of the device to activate the extinguishing system. When activated an alarm will sound and the release valve placed on the extinguisher in the main housing body will open in turn causing the extinguisher to apply a fire retardant substance under high pressure into the extinguishing ring. The extinguishing rings runs outside the perimeter of the main housing body and when functional dispenses the fire retardant substance through twelve retardant outlets running along the top of the extinguishing ring. The audio system works by a compact disc player situated in the main housing body supplying audio signals to four speakers arrayed throughout the secondary housing body.

2. Description of the Prior Art

There are other Christmas tree stands designed for decoration, although none of them have a means of extinguishing a fire. The need for such a system is apparent because many people exceed the amount of lights and wiring that is safe to place upon a tree thus presenting a fire hazard. This fire hazard is further increased with flammable items commonly surrounding the tree such as presents wrapped in materials most commonly being paper and cardboard. The advantages the present device provides as opposed to standard tree stands available are as follows. The present invention is an isolated self-activating extinguishing system for multiple possible hazards in that it provides a flame, smoke and CO2 sensor and an extinguishing means. This device is superior to standard extinguishers due to in the event of a fire the owner does not have to run to acquire an extinguisher for the specific hazard due to the devices self-monitoring capabilities. In a fire situation a sprinkler extinguishing system would be held at a disadvantage in that in order to operate correctly the entire area is saturated with an extinguishing substance thus possibly causing damage to the entire area effected. Sprinkler systems are also held at a disadvantage in that they take a longer time to activate due to sensors being placed at random distances away from the tree instead of being placed local to the potential hazard and activated at first indication of a fire. Another advantage presented by the present invention is in the event of a fire the extinguishing substance is dispersed upward and centrally into the hazard extinguishing the base and core of the fire first. This is done via an extinguishing ring located around the perimeter of the main housing body. Standard extinguishers must be manually aimed and may be improperly used by an unknowledgeable operator possibly causing the user to not be able to effectively eliminate the hazard. Sprinkler systems are not as effective in that they spray downward onto the flame, not reaching the base of the flame as effectively as the device presented, therefor needing a prolonged time to eliminate the hazard in comparison for the present invention. An additional advantage is that the present device provides fire retardant foam capable of extinguishing the most likely types of fire a Christmas tree would encounter. The fire retardant foam works by providing a means by which to smother the fire in whatever the form may be. Most home extinguishers are at a disadvantage in this aspect because most are a class A extinguisher not capable of extinguishing an electrical fire and most sprinkler systems use water as an extinguishing mean which is electrically conductive and therefor not as effective in smothering a fire unlike a fire retardant foam, causing it to be useless in such an event. The present invention also differs from other Christmas tree stands in that located in the secondary housing a motor fitted with a bevel gear turns another bevel gear attached to the mounting collar causing it to rotate. This aspect of the tree is useful in that many times all sides of a stationary tree are not visible and are hidden, rotating the tree causes all perspectives of the tree to be seen thus eliminating this problem. In addition the present invention also has installed into it a compact disc player and four speakers Along with four lights to illuminate the tree. The advantage this presents is an enhancement of the aesthetic qualities of the overall tree.

While these Christmas tree stands may be suitable for the purposes for which they were designed, they would not be as suitable for the purposes of the present invention, as hereinafter described.

SUMMARY OF THE PRESENT INVENTION

The present invention discloses a safety stand for a tree having a main housing body and attached thereto a secondary housing body. The main housing is elliptically shaped having situated thereon illumination lights, LED lights along with transparent picture sleeves. Also attached thereto is a mounting collar with threaded screws for receiving and holding a tree trunk along having an electrical outlet disposed thereon. The main housing also contains a CD player along with a water reservoir for watering the tree. Also contained on the main housing is an extinguisher system having flame sensors attached thereto in the form of decorative ornamental bulbs placed throughout the tree. Vent holes are provided in the bulbs through which air can pass in the form of smoke so as to activate the sensors and thereby having a bulb transmitter send a signal to an alarm disposed in the main housing body. Extinguishing conduits run around the outside of the main housing having retardant outlets disposed thereon through which retardant is released from a pressurized fire retardant compartment. The secondary housing body contains a tree rotation system comprising a motor and bevel gears along with a mounting collar. An alternative embodiment is disclosed wherein an artificial tree is held within a central rotating shaft and a central conduit for fire retardant is contained therein so that the sensor when activated will disperse retardant over and about the artificial tree. Another embodiment discloses a bulb having fire retardant outlets and a supply of retardant disposed therein which bulb rotates and directly sprays retardant about.

A primary object of the present invention is to provide a safer Christmas tree.

Another object of the present invention is to provide a Christmas tree with a fire extinguishing system.

Yet another object of the present invention is to provide a Christmas tree with a rotation system.

Still yet another object of the present invention is to provide a Christmas tree that plays music.

Another object of the present invention is to provide a sensor capable of detecting flame, smoke and CO2.

Yet another object of the present invention is to provide an extinguisher capable of dispensing a fire retardant foam.

Still yet another object of the present invention is to provide a fire alarm.

Another object of the present invention is to provide a means to provide power while rotating.

Yet another object of the present invention is to provide an illumination system for the tree Additional objects of the present invention will appear as the description proceeds.

The present invention overcomes the shortcomings of the prior art by providing a safer Christmas tree that has the capabilities of detecting a fire, extinguishing a fire, providing an alarm, producing a means of rotation, plays music, illuminates the tree and provides a means of power while rotating.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
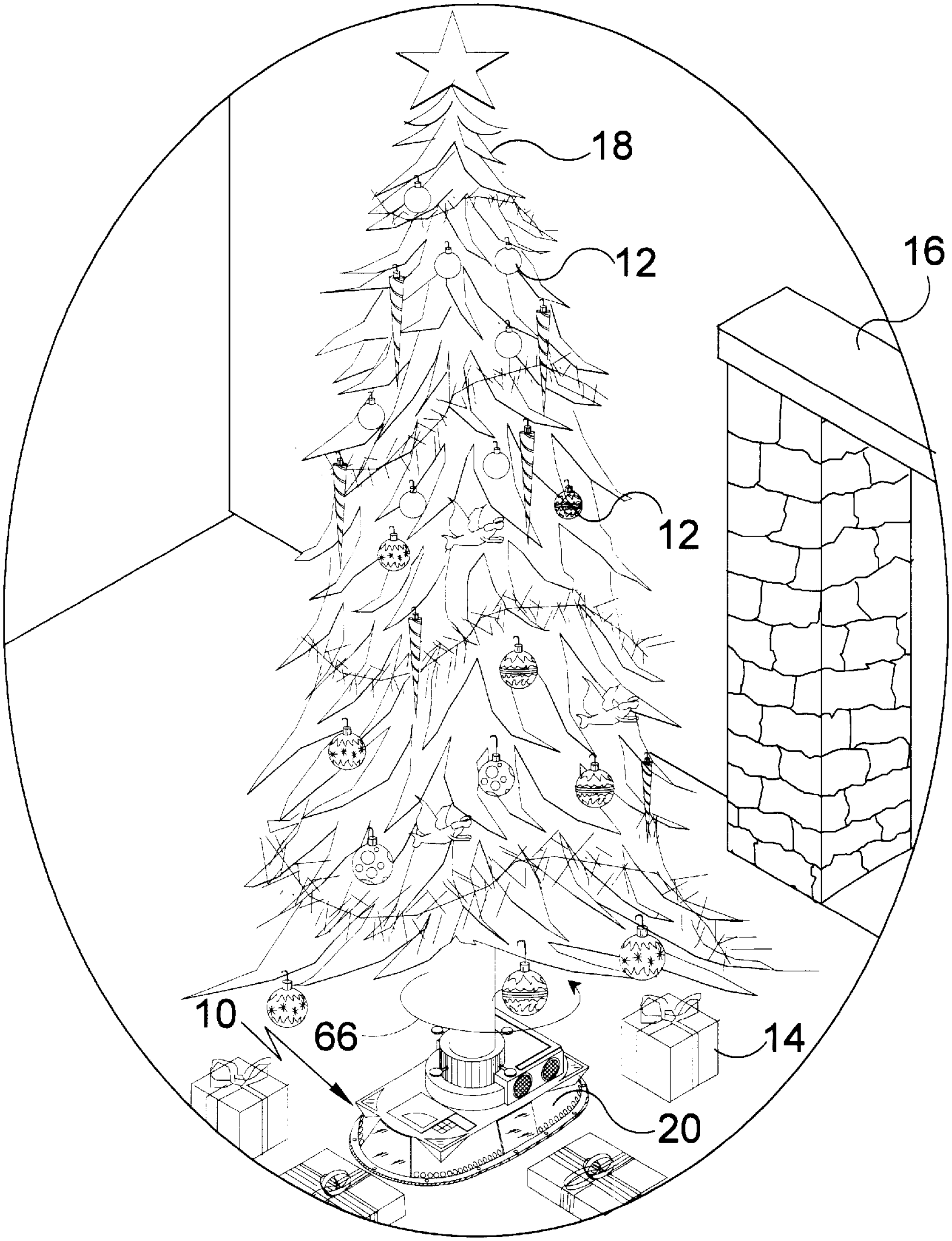
FIG. 1 is a perspective view of the entire tree decorated with sensing bulbs with presents by a fireplace showing the size and relation of the main housing body in reference to a Christmas tree.

With regard to reference numerals used, the following numbering is used throughout the drawings.

10 present invention

12 sensing bulb

14 presents
16 fireplace
18 Christmas tree
20 main housing
22 speakers
24 compact disc player
26 illumination lights
28 mounting collar
30 mounting screws
32 secondary housing
34 power outlet
36 LED
38 transparent picture sleeves
40 extinguishing ring
42 retardant outlets
44 recessed handle
46 alarm
48 bevel gear
50 motor
52 bevel gear
54 copper rings
56 contact brushes
58 valve release
60 extinguisher
62 water reservoir
64 power source
66 arrows
68 spherical bulb housing
70 bulb air vents
72 hook
74 batteries
75 electrical cord
76 sensor
78 transmitter
80 bulb retardant outlets
82 rotating bracket
84 bulb extinguisher
86 central rotating shaft
88 central conduit
90 caster
92 lock
94 outlet vent
96 central outlet
98 cover
100 vent
102 CO2 spray
104 intake fan
106 branch
108 locking cylinder
110 fiber optic cables
112 music box
113 key
114 garland
116 flexible tubing
118 air vents
120 sensors
122 connection means

DESCRIPTION OF THE PREFERRED EMBODIMENT(S)

In order that the invention may be more fully understood, it will now be described, by way of example, with reference to the accompanying drawings in which FIGS. 1 through 17 illustrate the present invention being a safety stand for a tree.

Turning to FIG. 1, shown therein is a perspective view of the present invention 10 being a safety stand for a tree decorated with multiple sensing bulbs 12 with presents 14 by a fireplace 16 showing the size and relation of the main housing body 20 in reference to a Christmas tree 18 which tree may turn as indicated by arrow 66 in certain embodiments of the present invention.

Figure 2:
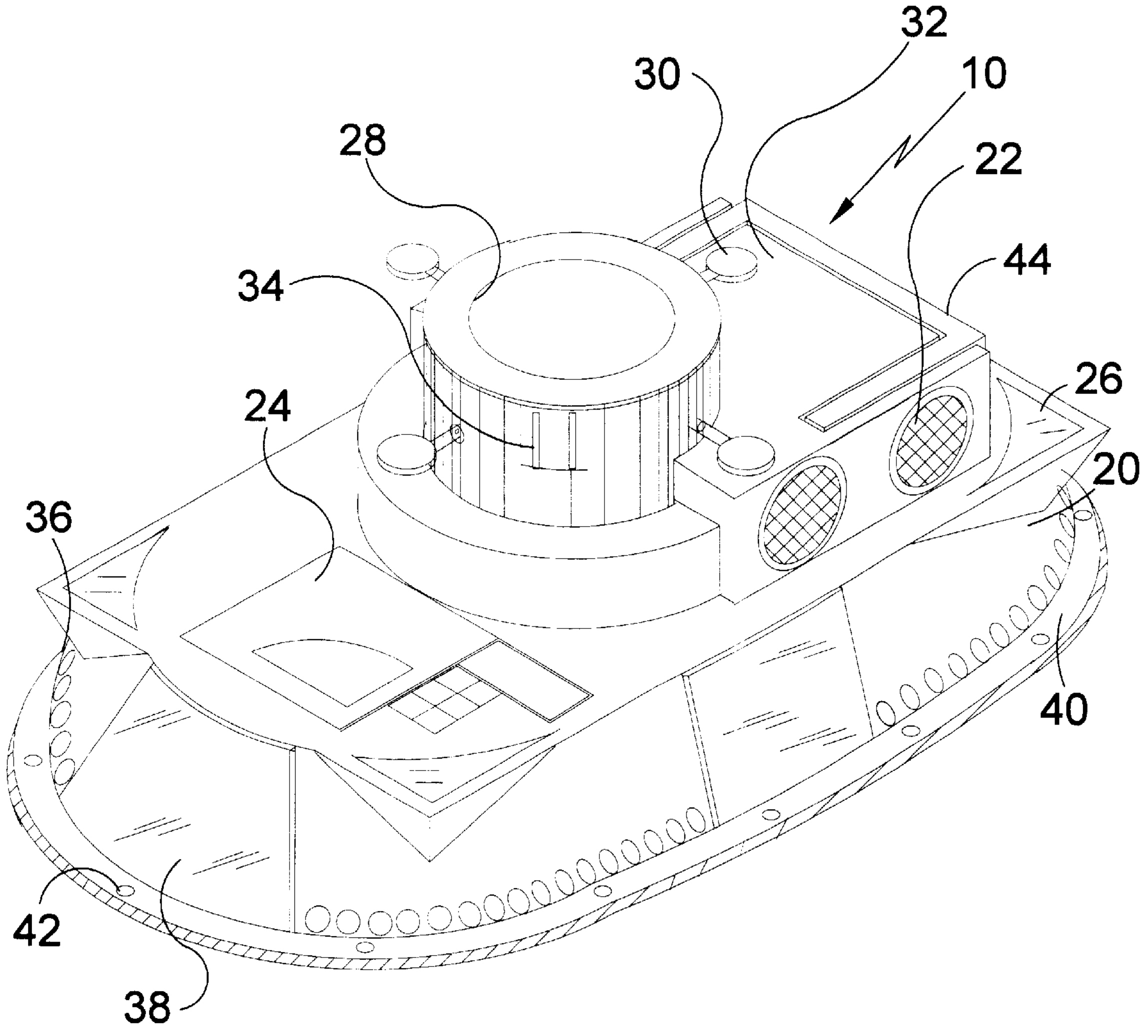
FIG. 2. is an isometric view of the present invention showing all the components visible from the outside featuring, speakers a CD player, illuminating lights, Handel and mounting collar.

Turning to FIG. 2, shown therein is an isometric view of the present invention 10 showing all the components visible from the outside of the main housing 20 featuring speakers 22, a compact disc (CD) player 24, illuminating lights 26, mounting collar 28 with multiple mounting screws 30 attached thereto. The present device consists mainly of three systems, being rotation, music production, and fire protection along with a housing body. The housing body consists of two main components being a main housing body 20 and a secondary housing body 32. Situated within the main housing body are the primary components of the extinguishing system, a power source (not shown, see FIG. 3), CD player 24 and a water reservoir (not shown, see FIG. 3). The mounting collar 28 serves the function of surrounding the base of the tree and a water reservoir providing water for the trees later use. The main housing body 20 is an elliptical shape to contain all the necessary components efficiently. Along the outside perimeter of the main housing 20 four illumination lights 26 are provided for the purpose of producing underlighting on the tree to produce a more aesthetic look. On the outside perimeter of the device are LED lights 36 to enhance the appearance of the device and in addition to transparent picture sleeves 38 have been applied to the front, back and sides so that a holiday theme picture may be provided. The mounting collar 28 serves as a means to grab the tree via threaded mounting screws 30 which secure the tree to the collar by exerting pressure onto the tree and boring into the tree. Also the mounting collar 28 serves as a means to provide power by an electric outlet 34 fitted on the upper portion powered by copper rings (not shown, see FIG. 3) making contact with two contact bushes (not shown, see FIG. 3) connected to a power source 64 (not shown, see FIG. 3). The extinguishing ring or conduit 40 runs along the outside of the perimeter of the main housing body 20 and when triggered to the functional mode receives five retardant from the pressurized extinguisher 60 and dispenses the fire retardant substance through twelve retardant outlets 42 running along the top of the extinguishing ring 40. The audio system works by a compact disc player 24 situated in the main housing body supplying audio signals to four speakers 22 arrayed throughout the secondary housing body 32. Also shown is a recessed handle 44.

Figure 3:
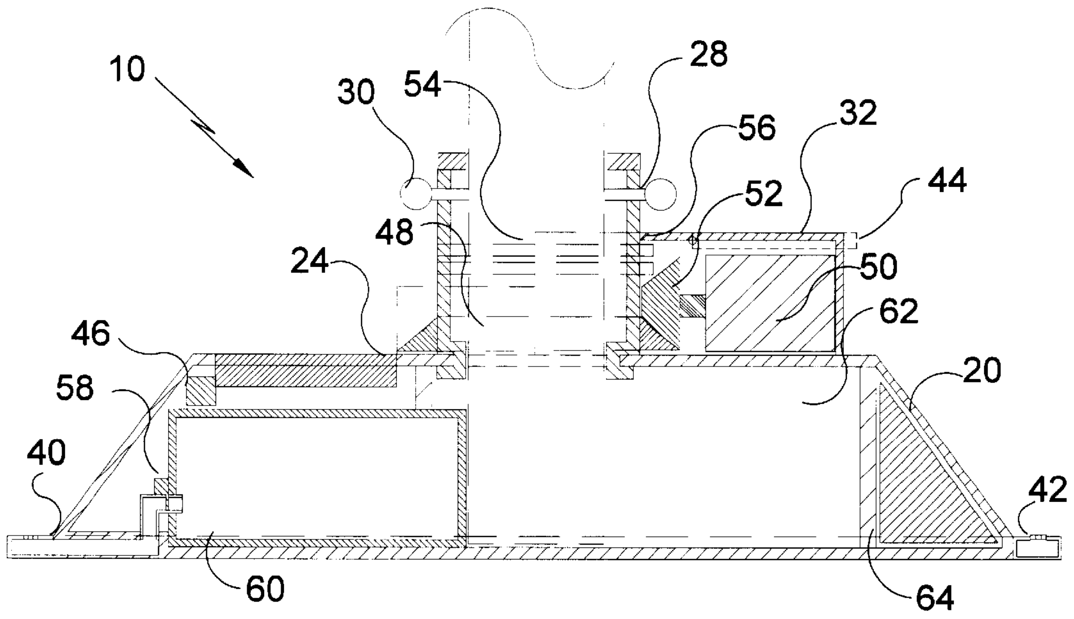
FIG. 3 is a cross section of the invention showing all of the components housed inside of the main body housing and secondary housing and their relations to each other

Turning to FIG. 3, shown therein is a cross section of the invention 10 showing all of the components housed inside of the main body housing 20 and secondary housing 32 and their relations to each other. The secondary housing body 32 contains all the primary components of the rotation system, a mounting collar 28, and the speakers 22 (not shown, see FIG. 2) associated with the audio system and alarm 46. The rotation system comprises two bevel gears 48, 52 situated into one another at a 90-degree angle. One bevel gear 52 is turned in either a clockwise or counter clockwise rotation by an electric motor 50, which in turn causes the second bevel gear 48 and mounting collar 28 to turn. Also shown are copper rings 54, contact brushes 56, valve release 58 of extinguisher 60, a water reservoir 62 and power source 64 previously mentioned.

Figure 4:
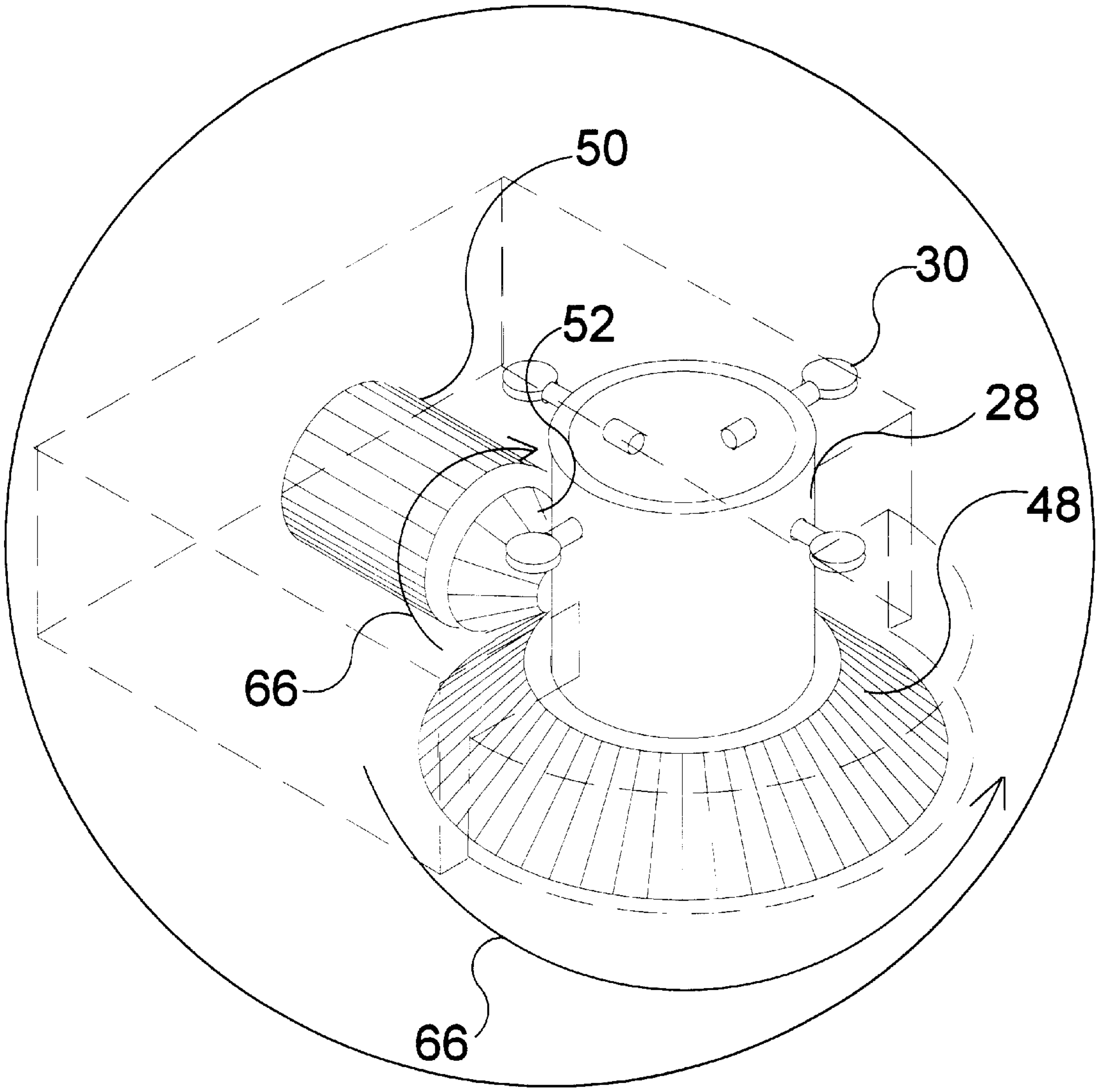
FIG. 4 is an isometric view of the components of the rotation system. Also shown are arrows to better displays the displacements of components as the motor operates in a clockwise rotation.

Turning to FIG. 4, shown therein is an isometric view of the components of the rotation system. Also shown are arrows 66 to better display the movements of components as the motor 50 operates in a clockwise rotation. Shown are the motor bevel gear 52, mounting screws 30, mounting collar 28, and mounting collar bevel gear 48.

Figure 5:
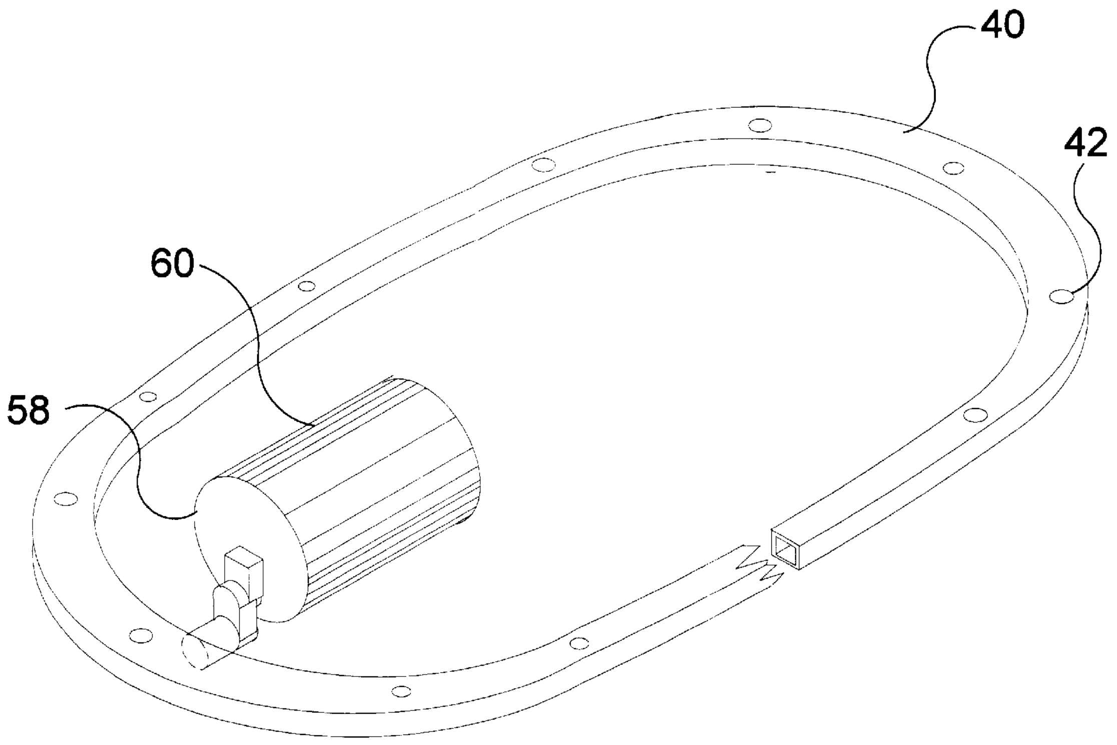
FIG. 5 is an isometric view of the extinguishing system and its components in relation to one another.

Turning to FIG. 5, shown therein is an isometric view of the extinguishing system and its components in relation to one another. Shown are the pressurized extinguisher 60 compartment, valve release 58, extinguisher ring or conduit 40 and retardant outlet 42. The pressurized retardant is released by an infrared signal received from a decorative sensor (not shown, see FIG. 7).

Figure 6:
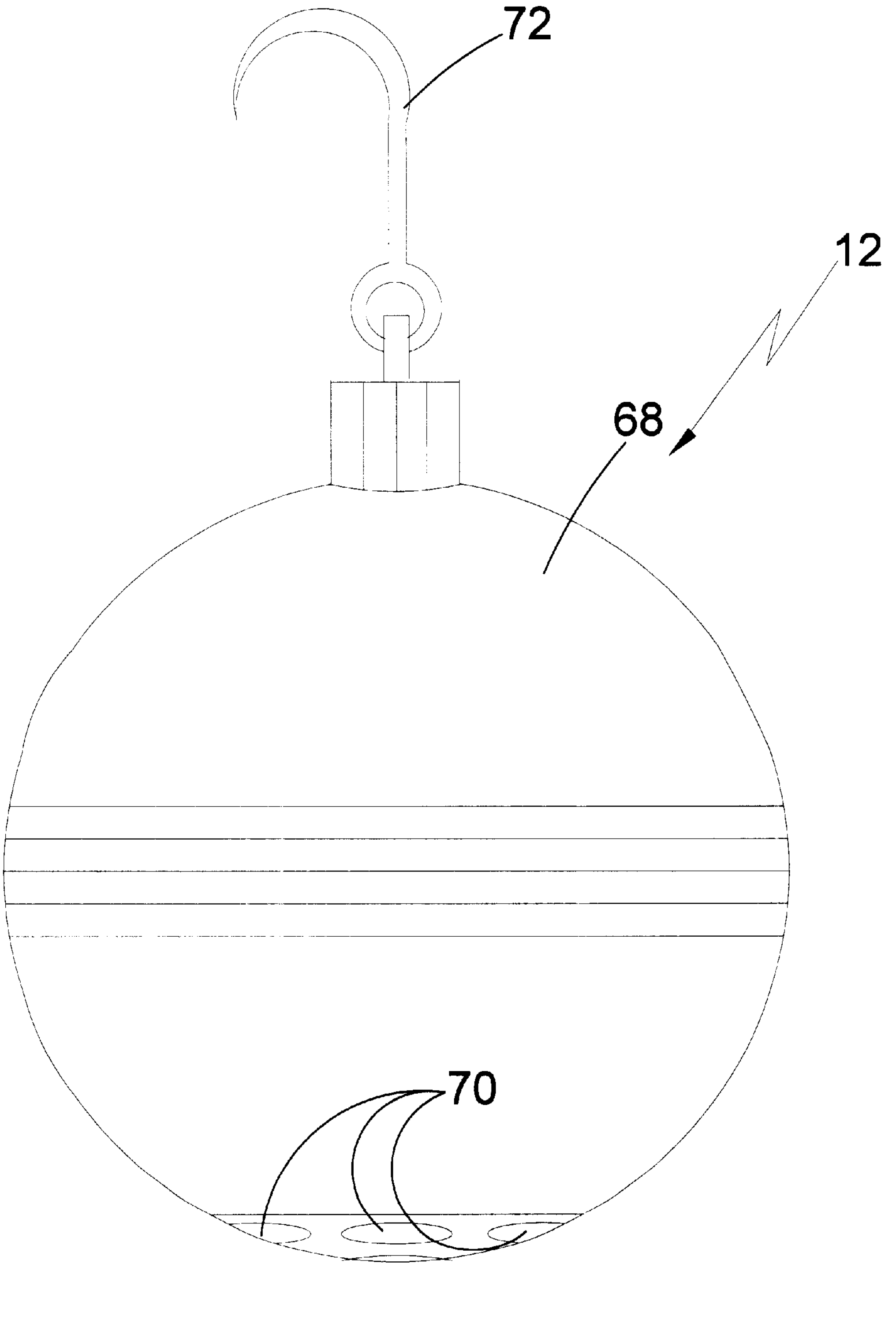
FIG. 6 is a frontal view of the sensing bulb from an outside perspective showing one possible outside decorative design.

Turning to FIG. 6, shown therein is a frontal view of the sensing bulb 12 from an outside perspective showing one possible outside decorative design. The spherical bulb housing 68 contains a plurality of air vent apertures 70 for smoke passage at its base along with a hanging hook 72.

Figure 7:
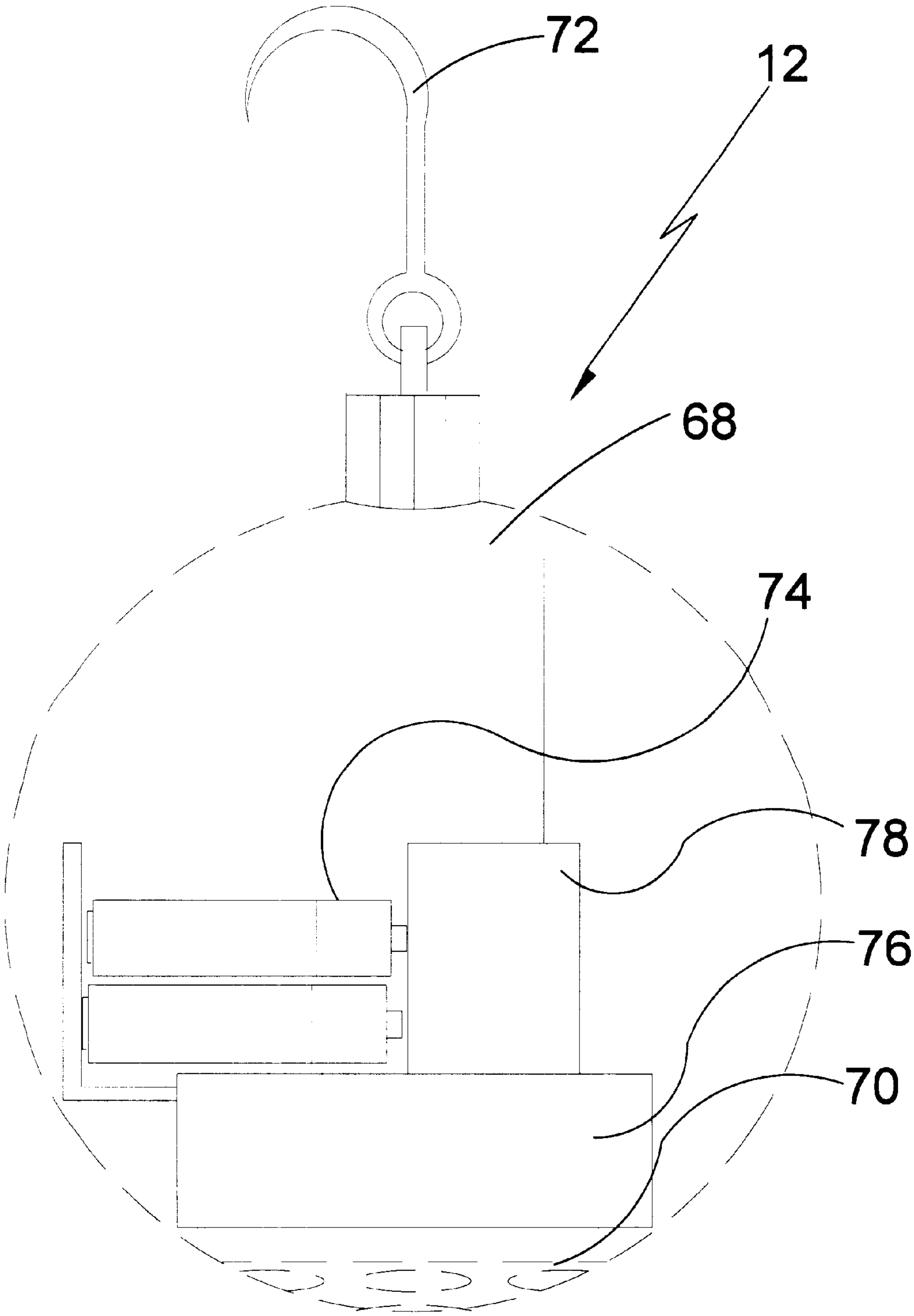
FIG. 7 is a frontal view of the sensing bulb with the bulb's outer exterior cut away showing the interior components and there relation's to each other showing also batteries as the bulb's power source.

Turning to FIG. 7, shown therein is a frontal view of the sensing bulb 12 with the bulb's outer exterior cut away showing the interior components and there relation to each other showing also replaceable batteries 74 as the bulb's power source. Smoke, CO2 and flame or heat sensors 76 in the form of decorative ornament bulbs 12 are placed throughout the tree with sensors 76 internal the bulbs 12. Vent holes 70 in the bottom of the bulb 12 are placed to allow air and smoke to be exposed to the sensor housed inside so that the sensor may function properly. Should a sensor detect a fire an infra red signal would be sent via the bulb's infrared transmitter 78 to the base 20 of the device to activate the extinguishing system. When activated an alarm 46 (not shown, see FIG. 3) will sound and the release valve 58 (not shown, see FIG. 3) placed on the extinguisher 60 (not shown, see FIG. 3) in the main housing body will open in turn causing the extinguisher to apply a fire retardant substance under high pressure into the extinguishing. Other elements previously disclosed are also shown.

Figure 8:
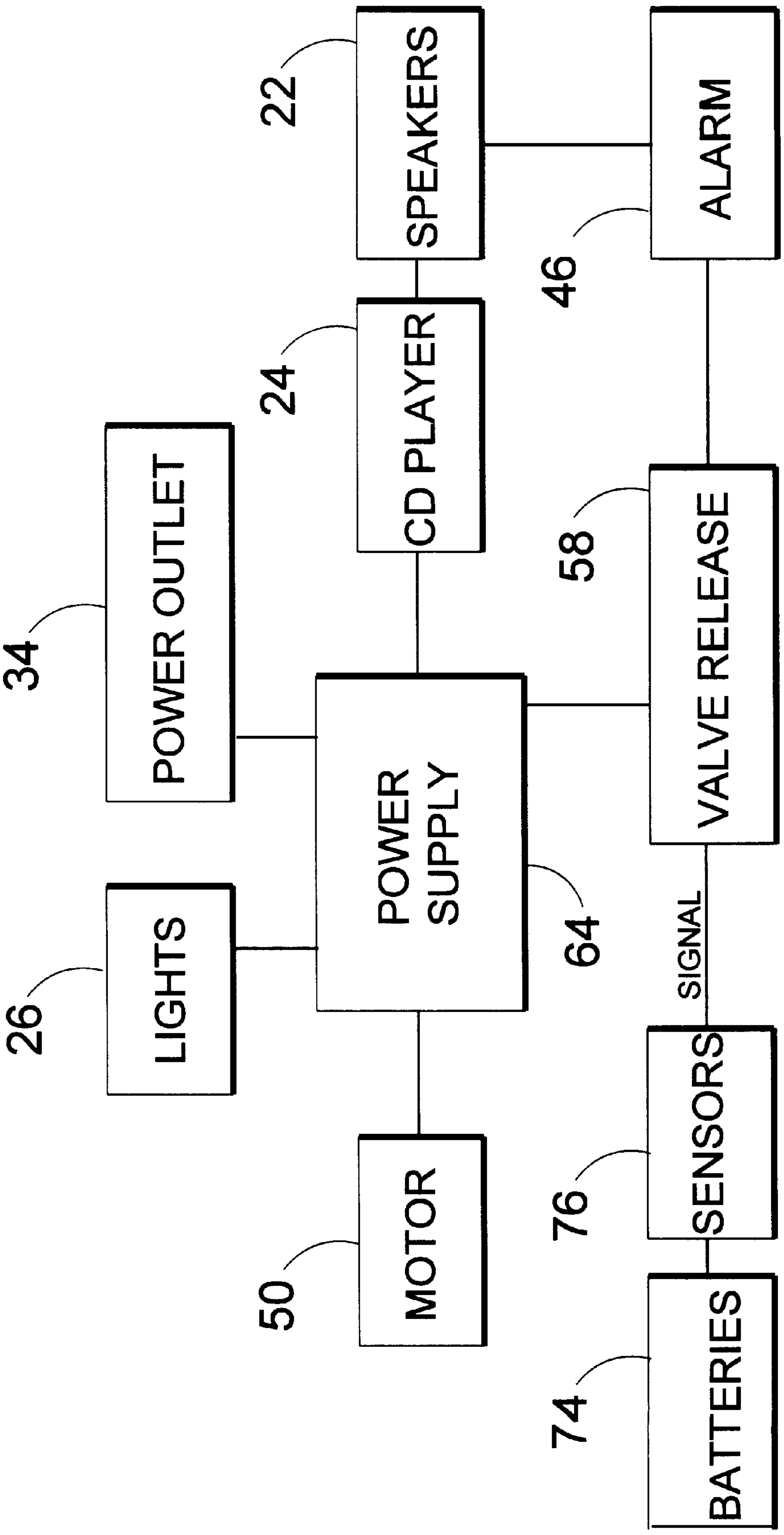
FIG. 8 is a power flow chart to display the flow of power the invention directs to the various components of the device and the order in which they receive power.

Turning to FIG. 8, shown therein is a schematic diagram of the present invention showing the various components of the device.

Figure 9:
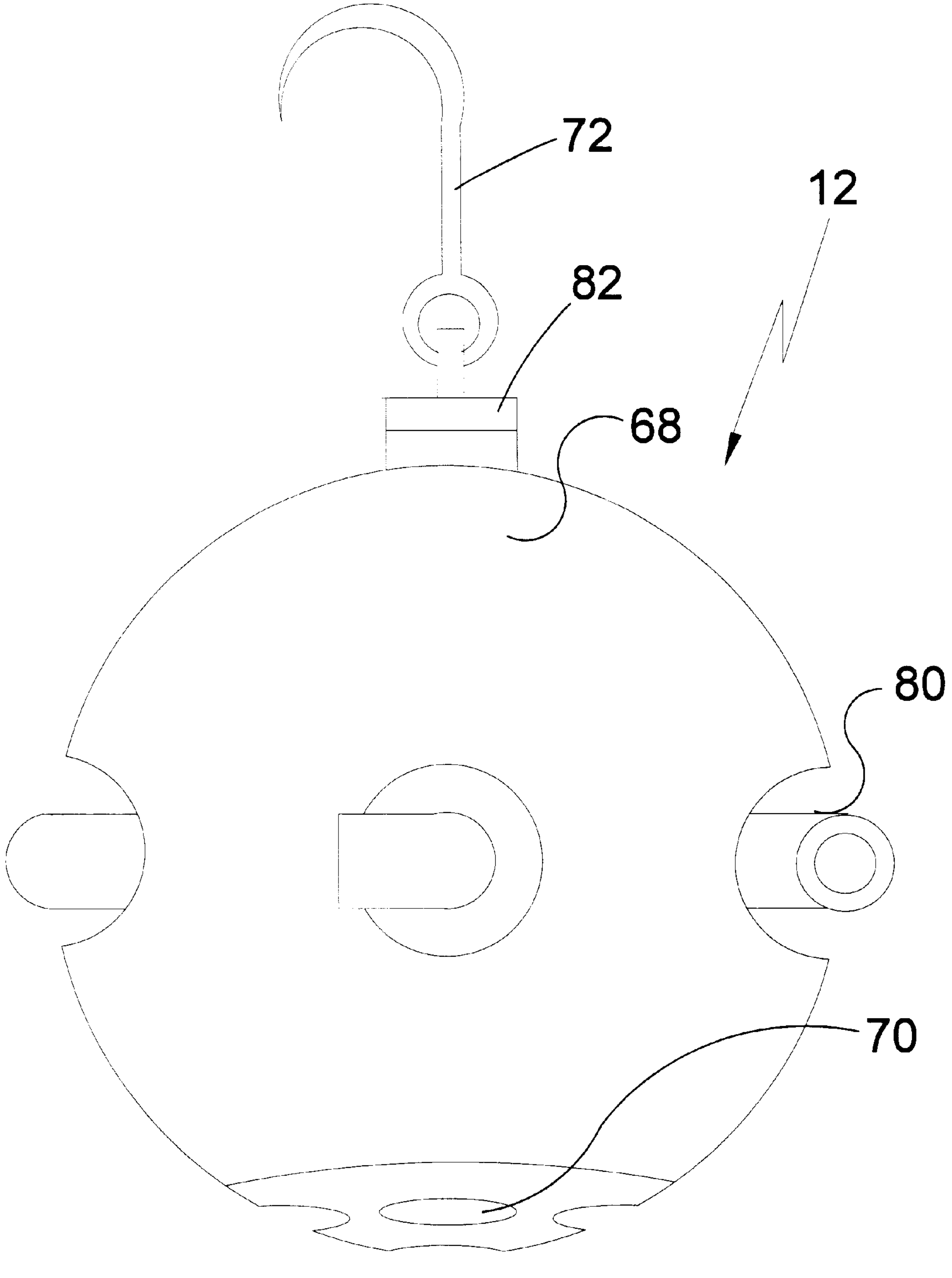
FIG. 9 is a frontal view of an alternate design of the sensor bulb that has a self-contained extinguishing system rather than in the base. Also displaying the retardant outlets protruding at a 90-degree angle to the side which would cause the ornament to spin while releasing the pressurized retardant thus affecting a larger area.

Tuning to FIG. 9, shown therein is a frontal view of an alternate design of the sensor bulb 12 that has a self-contained extinguishing system therein rather than in the base. Shown are the retardant outlets 80 protruding at a 90-degree angle to the side of the bulb which would cause the ornament to spin at the rotating bracket 82 while releasing the pressurized retardant thus affecting a larger area. Other elements previously disclosed are also shown.

Figure 10:
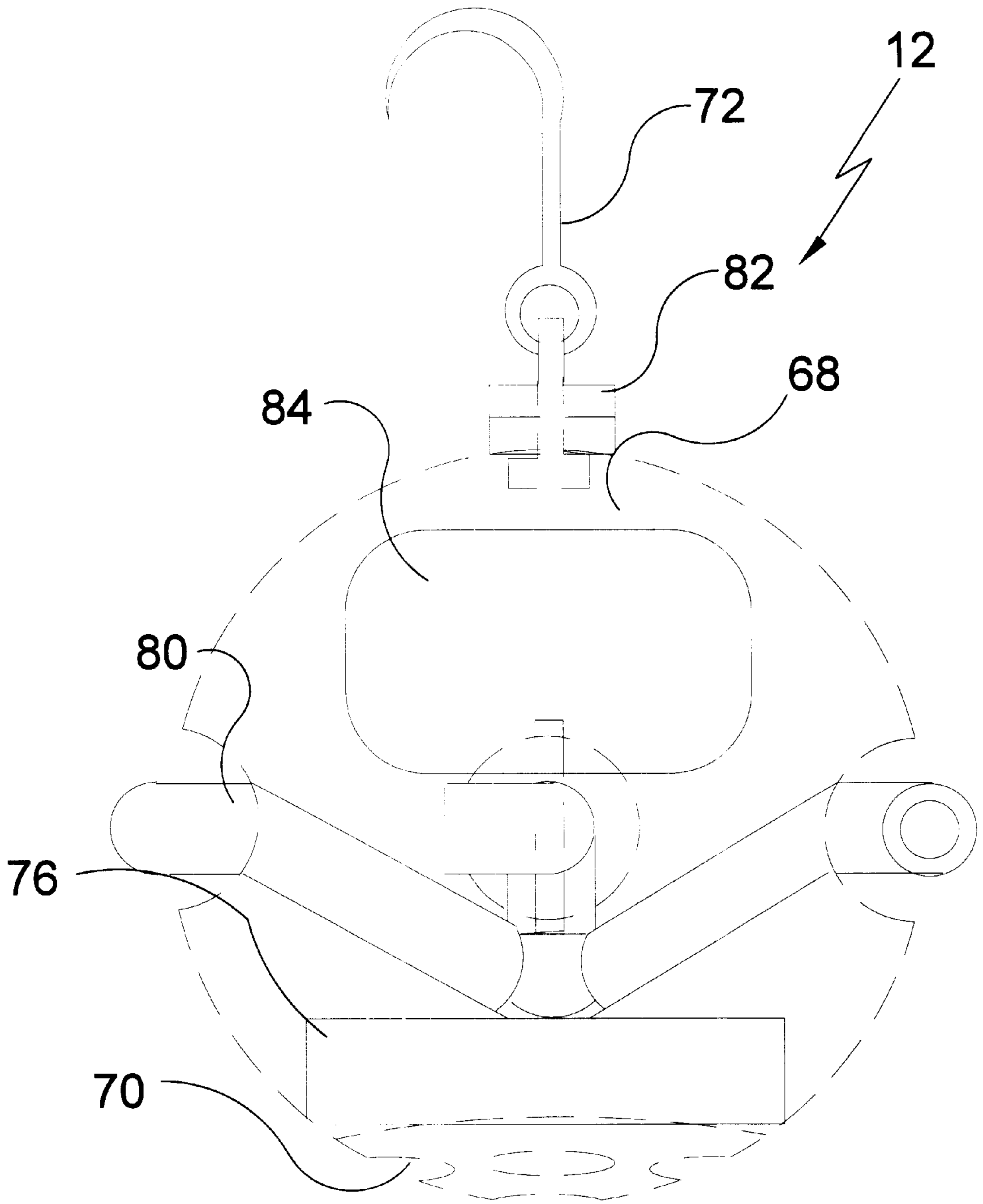
FIG. 10 is a cross section of an alternate design for the sensor bulb showing the extinguishing system that can be possibly placed inside along with the sensor.

Turning to FIG. 10, shown therein is a cross section of an alternate design for the sensor bulb 12 showing the bulb pressurized extinguisher compartment 84 of the extinguishing system that can be possibly placed inside along with the sensor 76. Other elements previously disclosed are also shown.

Figure 11:
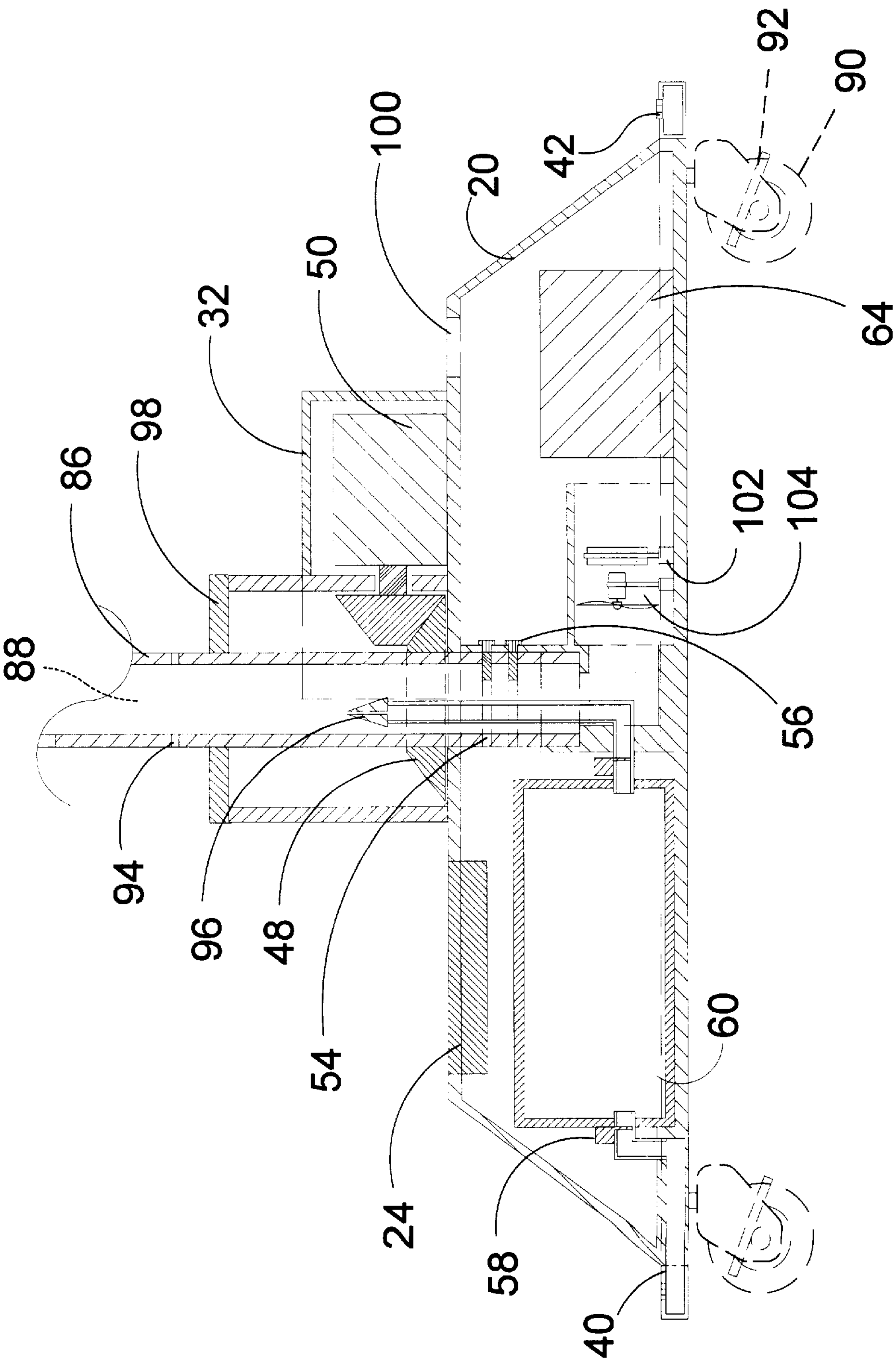
FIG. 11 is a cross section of a variation of the invention made to accommodate a artificial tree in which all the components have been modified and displaced to different areas to accommodate an artificial tree and an alternate extinguishing and sensing means.

Turning to FIG. 11, shown therein is a cross section of a variation of the invention made to accommodate an artificial tree in which all the components have been modified and displaced to different areas to accommodate an artificial tree and an alternate extinguishing and sensing mean. The central rotating post or shaft 96 serves to hold the tree branches as well as containing a central conduit 88 for dispersal of the fire retardant. Optional casters 90 for mobility with wheel locks 92 are also shown. Also shown are multiple intake vents 94 for receiving smoke and when triggered, for retardant dispersant therethrough, a central retardant outlet 96, stabilization cover 98, vent 100, CO2 sensor 102 and intake fan 104. Other elements previously disclosed are also shown.

Figure 12:
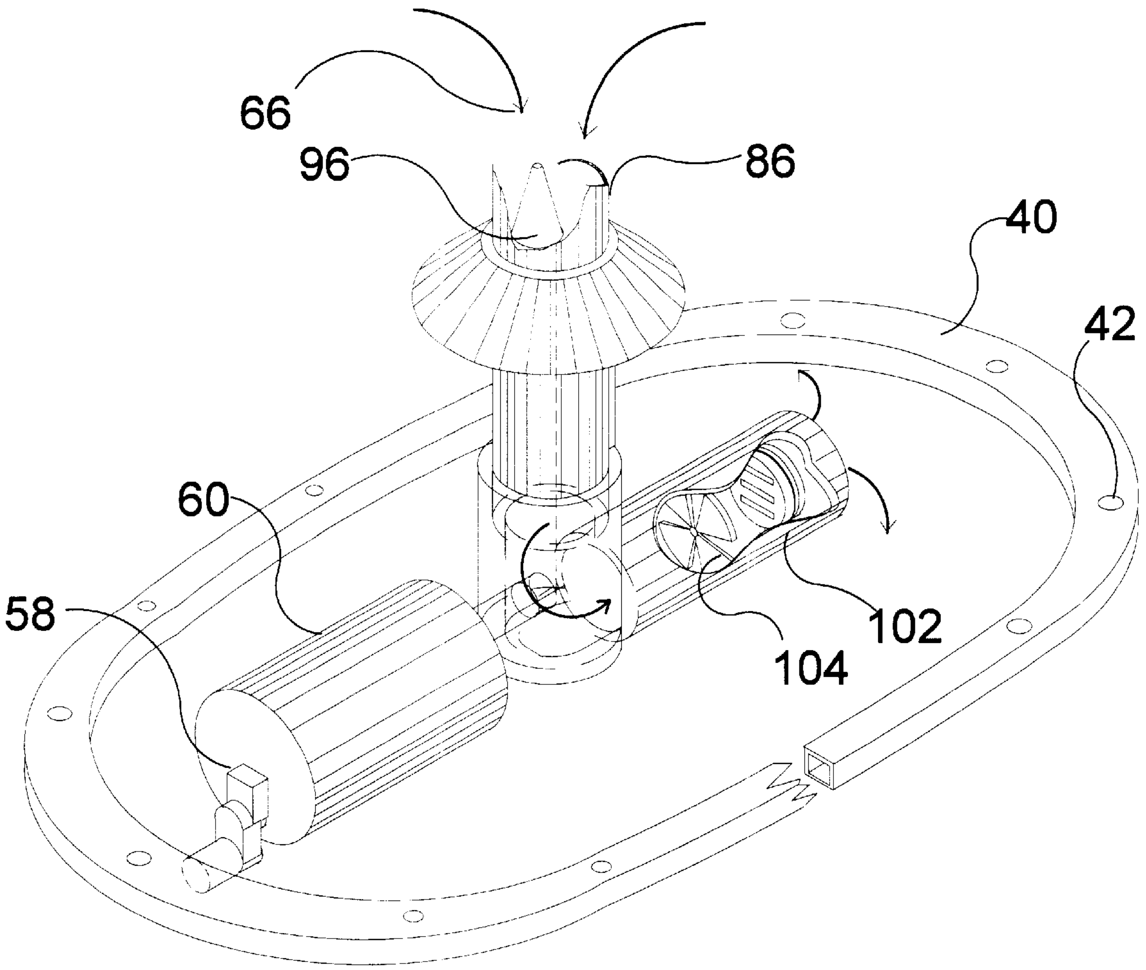
FIG. 12 is an isometric view of the extinguishing system that may be used in the case of an artificial tree being used rather than a live Christmas tree

Turning to FIG. 12, shown therein is an isometric view of the extinguishing system that may be used in the case of an artificial tree being used rather than a live Christmas tree using arrows 66 to indicate airflow within the system. Intake fan 104 receives air and smoke through intake vents 94 (not shown, see FIG. 14). Other elements previously disclosed are also shown.

Figure 13:
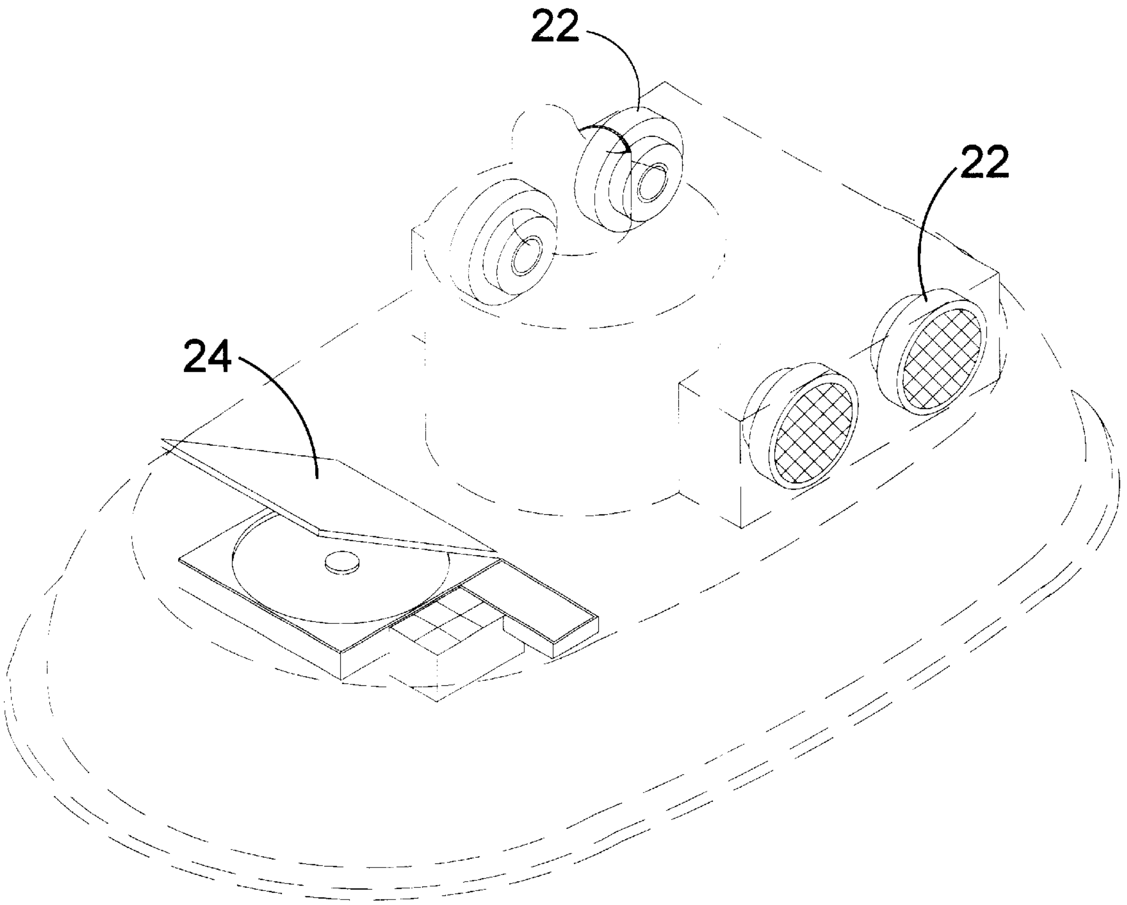
FIG. 13 is an isometric view of the audio system and its relations to the present invention in which the main housing body and secondary housing have indicated by dotted lines.

Turning to FIG. 13, shown therein is an isometric view of the audio system with CD player 24 and speakers 22 and its relation to the present invention in which the main housing body and secondary housing are indicated by dotted lines.

Figure 14:
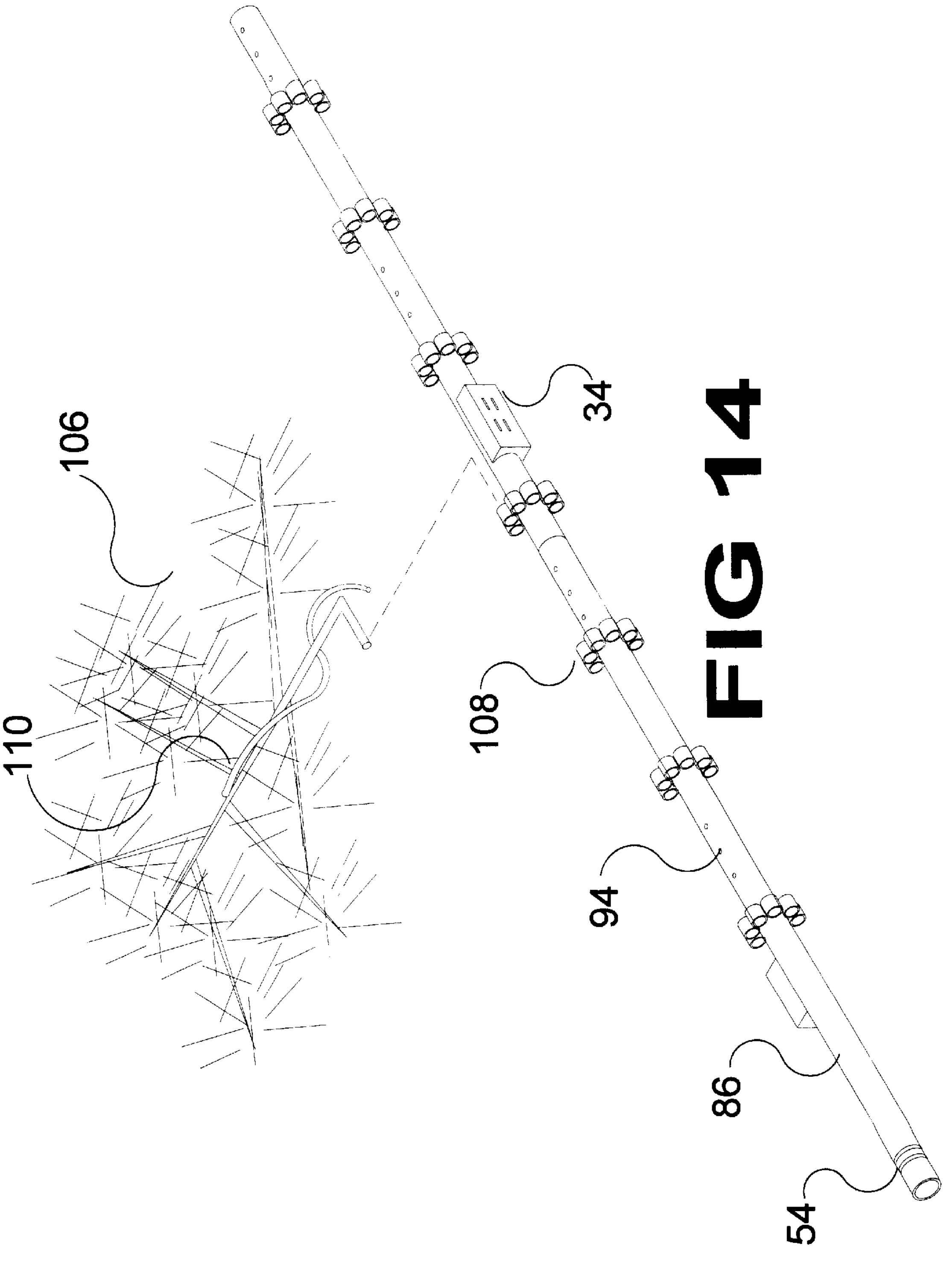
FIG. 14 is an isometric view of the rotating shaft that would be used in conjunction to the alternate design for an artificial tree.

Turning to FIG. 14, shown therein is an isometric view of the central rotating shaft 86 with throughbore that would be used in conjunction to the alternate design for an artificial tree. Shown is an exemplary branch 106, copper rings 54, intake vents 94 for receiving smoke and dispensing retardant therethrough, locking cylinders 108 and power outlet 34. Additionally, shown therein are optional fiber optic cables 110 for providing a lighted, decorative display amongst the artificial branches 106.

Figure 15:
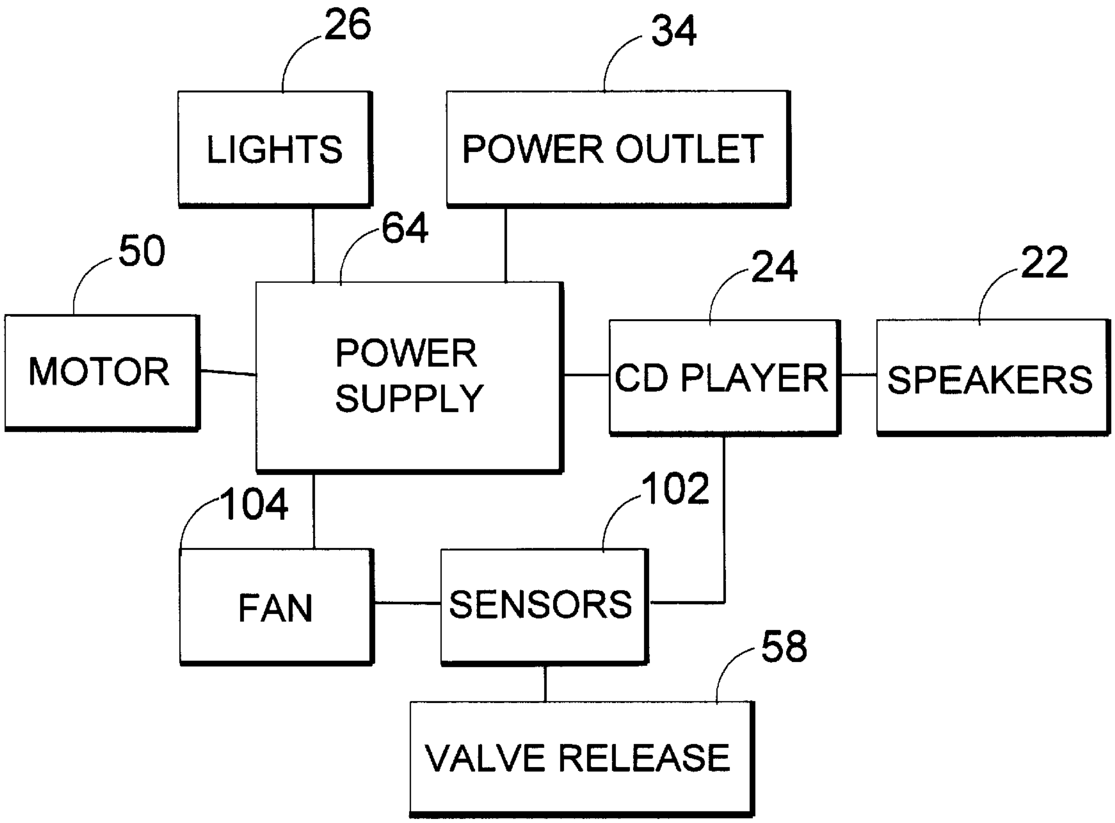
FIG. 15 is a flow chart to show the displacement of power that would take place in the case that an artificial tree was used instead of a live Christmas tree.

Turning to FIG. 15, shown therein is a schematic diagram to of the present invention in the embodiment where an artificial tree is used instead of a live Christmas tree.

Figure 16:
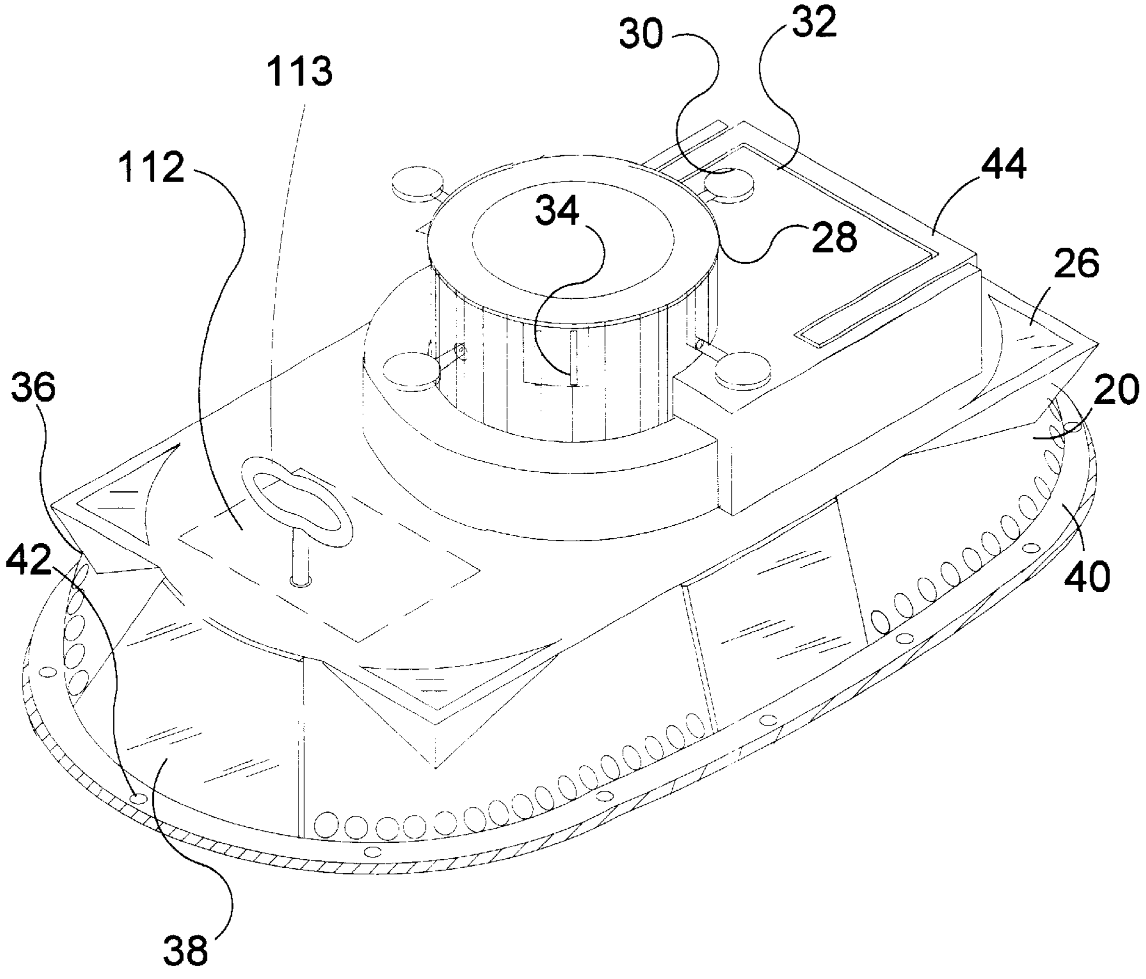
FIG. 16 is a perspective view of another embodiment of the present invention.

Turning to FIG. 16, shown therein is an embodiment comprising a music box 112 mounted internally in the main housing 20 which is controlled by a large ornamental key 113. In this embodiment the tree (not shown, but see items 18, 66 of FIG. 1) is mounted and turned by the rotation system within mounting collar 28 when the music box 112 is activated Other elements previously disclosed are also shown.

Figure 17:
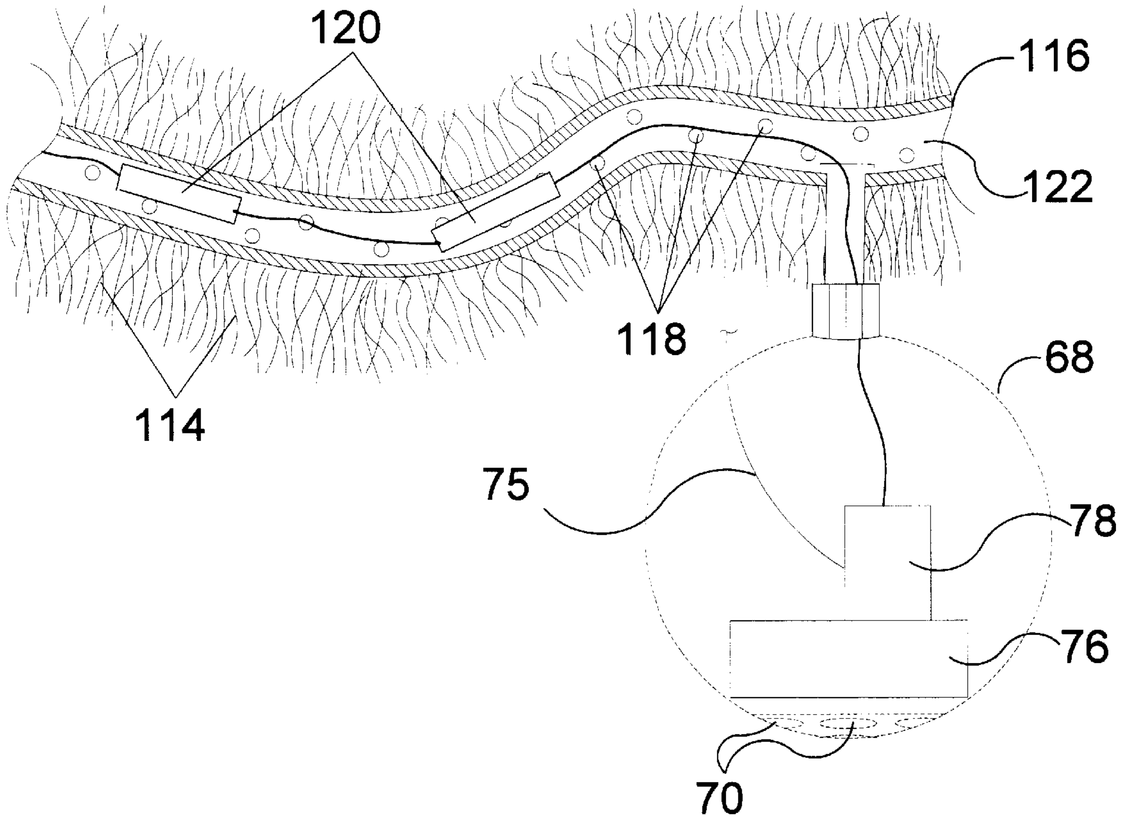
FIG. 17 is a perspective view of another embodiment of the present invention showing garland with smoke sensors therein.

Turning to FIG. 17, shown therein is an embodiment showing garland 114 comprising flexible central tubing 116 with air vents 118 in the wall thereof and internal sensors 120 having a connection means 122 for attaching a bulb housing 68 as previously described having an infrared transmitter 78 therein for use with the present invention as previously disclosed. In this embodiment, the batteries may be replaced by an external electrical power source 75 as would be done by one skilled in the art, e.g., an AC power source.

I claim:

1. An apparatus for a safety stand for receiving and holding a tree, the tree having a trunk with branches disposed thereon, comprising:

a) a main housing body;

b) means for securely receiving the tree trunk disposed in said main housing body;

c) means for a fire extinguisher disposed in said main housing body;

d) sensor means for activating said fire extinguisher;

e) means for an audible alarm disposed in said main housing body; and, f) means for a source of power for operating the apparatus disposed in said main housing body; wherein said fire extinguisher comprises a pressurized fire retardant compartment containing a fire retardant substance, and a valve release mechanism disposed on said fire retardant compartment for releasing said fire retardant substance, an extinguishing conduit disposed around the periphery of said main housing body.

2. The apparatus of claim 1, further comprising means for rotating the tree disposed in said main housing body.

3. The apparatus of claim 2, further comprising means for music production disposed in said main housing body.

4. The apparatus of claim 3, wherein said main housing body is elliptically shaped.

5. The apparatus of claim 4, wherein said main housing body further comprises a plurality of light-emitting diodes disposed about its perimeter for lighting the tree, a plurality of illumination lights disposed about its body for lighting a tree, and a plurality of transparent picture sleeves disposed about its body.

6. The apparatus of claim 5, wherein said main housing body further comprises means for a water reservoir disposed therein whereby the tree can be watered.

7. The apparatus of claim 5, wherein said means for securely receiving the tree further comprises a mounting collar for encircling the tree trunk, and a plurality of mounting screws disposed about said mounting collar for contacting the tree trunk.

8. The apparatus of claim 7, wherein said means for rotating the tree further comprises a means for a motor, a means for a first bevel gear connected to said motor, and means for a second bevel gear connected to said first bevel gear and to said mounting collar whereby said motor rotates and turns said mounting collar and the tree mounted in said mounting collar.

9. The apparatus of claim 8, wherein said means for music production further comprises a compact disc player, and a plurality of speakers disposed about said main housing body.

10. The apparatus of claim 9, wherein said means for a fire extinguisher further comprises a plurality of bulb housing means mounted on the tree, said extinguishing conduit connected to said fire retardant compartment, said extinguishing conduit having a plurality of retardant outlets therein, said retardant outlets for releasing a fire retardant therethrough.

11. The apparatus of claim 10, wherein said bulb housing means further comprises a plurality of air vents disposed therein, said air vents for receiving air therethrough, a means for a sensor for detecting smoke, CO2 or heat, a transmitter for sending a signal to said main housing body, a power supply, and a hook for attachment to a tree.

12. The apparatus of claim 10, wherein said means for a fire extinguisher further comprises a plurality of bulb housing means mounted on the tree.

13. The apparatus of claim 9, wherein said bulb housing means further comprises a plurality of air vents disposed therein, said air vents for receiving air therethrough, a means for a sensor for detecting smoke, CO2 or heat, a power supply, a hook for attachment to a tree, a pressurized fire retardant compartment containing a fire retardant substance, a plurality of outlet means whereby said fire retardant can be sprayed about thereby causing said bulb housing means to be rotated, and a rotating bracket for rotating said bulb housing means.

14. The apparatus of claim 10, wherein said means for a fire extinguisher further comprises a central rotating shaft, said shaft being disposed in said mounting collar, said shaft serving as the tree trunk of an artificial tree, said tree having a plurality of artificial branches thereon, a pressurized fire retardant compartment containing a fire retardant substance, a valve release mechanism disposed on said fire retardant compartment for releasing a retardant, an extinguishing conduit disposed about the periphery of said main housing body, said extinguishing conduit connected to said fire retardant compartment, said extinguishing conduit having a plurality of retardant outlets therein, said retardant outlets for releasing a fire retardant therethrough.

15. The apparatus of claim 14, further comprising means for a central retardant outlet disposed on said fire retardant compartment whereby retardant is directed upwardly through said central rotating shaft, and said shaft having a plurality of intake vents thereon through which air passes.

16. The apparatus of claim 15, further comprising an intake fan for sucking air through said intake vents, and a smoke, CO2 or heat sensor, said intake fan directing air toward said sensor.

17. The apparatus of claim 16, further comprising means for fiber optic cables disposed on said branches of the tree.

18. The apparatus of claim 3, wherein said main housing body further comprises a music box disposed thereon.

19. The apparatus of claim 15, further comprising means for garland, wherein said means for garland further comprises flexible tubing having a plurality of air vents disposed in a wall thereof, and a plurality of sensors disposed therein, and having means to attach a plurality of bulb housing means further comprises a plurality of air vents disposed therein, said air vents for receiving air therethrough, means for a sensor for detecting smoke, CO2 or heat, a transmitter for sending a signal to said main housing body, a power supply, and a hook for attachment to a tree.

20. The apparatus of claim 8, wherein said means for a source of power further comprises a battery, and a plurality of copper rings disposed about and encircling said mounting collar, and a plurality of contact bushes for contacting said rings, said bushes being connected to said battery.

21. The apparatus of claim 14, wherein said means for a source of power further comprises a battery, and a plurality of copper rings disposed about and encircling said mounting collar, and a plurality of contact bushes for contacting said rings, said bushes being connected to said battery.

22. The apparatus of claim 21, wherein said means for a source of power further comprises an external power source.

* * * * *